United States Patent [19]
Yessik et al.

[11] Patent Number: 5,390,204
[45] Date of Patent: Feb. 14, 1995

[54] INTRACAVITY MODULATED PULSED LASER WITH A VARIABLY CONTROLLABLE MODULATION FREQUENCY

[75] Inventors: Michael J. Yessik, Burlingame; Richard G. Thompson, Santa Clara, both of Calif.

[73] Assignee: Incisive Technologies, Inc., San Carlos, Calif.

[21] Appl. No.: 951,075

[22] Filed: Sep. 25, 1992

[51] Int. Cl.$^6$ .................. H01S 3/117; H01S 3/109
[52] U.S. Cl. .................. 372/38; 372/13; 372/22; 372/25; 372/26; 606/11; 606/12; 607/89
[58] Field of Search .................. 372/11, 13, 25, 26, 372/22, 38, 30, 31; 606/10, 11, 12; 607/89

[56] References Cited

U.S. PATENT DOCUMENTS

| | | |
|---|---|---|
| 3,513,409 | 12/1966 | Polk et al. |
| 3,821,510 | 6/1974 | Muncheryan |
| 3,878,478 | 4/1975 | Drexhage ............... 372/11 |
| 3,884,236 | 5/1975 | Krasnov |
| 4,105,952 | 8/1978 | Tulip |
| 4,273,109 | 6/1981 | Enderby |
| 4,273,535 | 6/1981 | Yamamoto et al. |
| 4,288,758 | 9/1981 | Seguin et al. |
| 4,316,476 | 2/1982 | Muckerheide |
| 4,337,442 | 6/1982 | Mauck ............... 372/13 |
| 4,503,853 | 3/1985 | Ota et al. |
| 4,521,194 | 6/1985 | Myers et al. |
| 4,538,609 | 10/1985 | Takenaka et al. |
| 4,672,969 | 6/1987 | Dew |
| 4,719,639 | 1/1988 | Tulip |
| 4,784,135 | 11/1988 | Blum et al. |
| 4,818,230 | 4/1989 | Myers et al. |
| 4,826,431 | 5/1989 | Fujimura et al. |
| 4,852,567 | 8/1989 | Sinofsky |
| 4,874,315 | 10/1989 | Featherstone et al. |
| 4,877,401 | 10/1989 | Higuchi et al. |
| 4,930,901 | 6/1990 | Johnson et al. ............... 372/26 |
| 4,940,411 | 6/1990 | Vassiliadis et al. |
| 4,979,180 | 12/1990 | Muncheryan |
| 5,018,152 | 5/1991 | Linne et al. ............... 372/25 |
| 5,020,995 | 6/1991 | Levy |
| 5,037,421 | 8/1991 | Boutacoff et al. |
| 5,048,034 | 9/1991 | Tulip |
| 5,055,048 | 10/1991 | Vassiliadis et al. |
| 5,059,200 | 10/1991 | Tulip |
| 5,090,908 | 2/1992 | Teumim-Stone |
| 5,092,773 | 3/1992 | Levy |
| 5,125,922 | 6/1992 | Dwyer et al. |
| 5,151,909 | 9/1992 | Davenport et al. ............... 372/13 |
| 5,197,074 | 3/1993 | Emmons, Jr. et al. ............... 372/26 |

FOREIGN PATENT DOCUMENTS 2597745 10/1987 France.

OTHER PUBLICATIONS

"Prevention of Dental Caries by Acosto-Optically Q-Switched ND:YAG Laser Irradiation", J. Dent. Res. 59(2): 137, Feb. 1980.

Abstract of "Clinical Application in Oral Surgery and Basic Researchs of ND:YAG Laser with Handpieces Designed for Dentistry", Sato, et al. 1985 (no month available).

"Application of Laser on Dental Treatment," J. Osaka Univ. Dent. Sch., vol. 23, 31–42, 1983 (no month available).

"Potential of Yttrim-Aluminum-Garnet Laser in Caries Prevention", J. Oral Path. 1974: 3, 7–15 (no month available).

"Pulp Effects of Neodymium Laser" Oral Surg., Oral Med., and Oral Path., vol. 44, No. 2, pp. 301–305, Aug. 1977.

(List continued on next page.)

Primary Examiner—Rodney B. Bovernick
Assistant Examiner—Robert McNutt
Attorney, Agent, or Firm—Lyon & Lyon

[57] ABSTRACT

An intracavity modulated pulsed laser comprising an amplification medium, a pulsed pumping source, a beam modulator, and two mirrors, one totally reflective and one partially reflective for generating at least one laser output burst comprising a plurality of sub-pulses having variably controllable peak powers.

51 Claims, 9 Drawing Sheets

OTHER PUBLICATIONS

"What Lasers Can Do for Dentistry and You", Dental Management, vol. 29, No. 4, pp. 26–30, Apr. 1989.

"In Vivo Caries Removal Utilizing the YAG Laser", Jour. Michigan Dental Assoc, vol. 67, Feb. 1985.

"In Vitro Caires Removal", CDA Journal, May 1988.

"Thermal Effects of Lasers on Dental Tissues", Lasers in Surgery and Medicine 7:473–477 (1987) no month available.

"Dentistry and the Laser", Lasers Applications in Medicine and Biology, vol. 2, pp. 361–388, 1974 no month available.

"Laser and the Dental Pulp", JADA, vol. 83, Jul. 1971.

"First Soft Tissue Study Utilizing a Pulsed ND:YAG Dental Laser" N.W. Dentistry, Mar. 1989.

"Effects of Carbon Dioxide Laser Radiation on Oral Soft Tissues: A Initial Report", Military Medicine, vol 144, No. 2, Feb. 1979.

"Latest Treatment in Dentistry by Means of the $CO_2$ Laser Beam", Lasers in Surgery and Medicine 6:396–398 (1986) no month available.

"Histopathological Changes in Dental Pulps Irradiated by $CO_2$ Laser: A Preliminary Report . . . ", Journal of Endodontics, vol. 11, No. 9, Sep. 1985.

"The $CO_2$ Laser in the Excision of Gingival Hyperplasia Caused by Nifedipine", J. Clin. Periodontology; 15: 633–635 (1988) no month available.

"Current Laser Dentistry", Lasers in Surgery and Medicine 6: 559–562 (1987) no month available.

"The Use of a Laser for Debridement of Incipient Caries", Jour. of Prosthetic Dentistry, vol. 53, No. 6, Jun. 1985.

"The Laser Gingivectomy", Journal of Periodontology, Aug. 1985.

"Dental Lasers—Myths, Magic, and Miracles?", Compend. Contend. Educ. Dent., vol. XII, No. 7, Jul. 1991.

"Hypersensitivity Study", Second World Laser Congress and the 1990 Federation Dental Internat'l Meeting in Singapore: Dec. 12, 1990.

"Selected Dental Research Performed with Lasers; 1965–present" no month available.

Dental abstracts, p. 513.

Dental abstracts, Dec. 1985, pp. 774–775 and 788.

Dental abstracts, Mar. 1978, pp. 132–133.

INTRACAVITY MODULATED PULSED LASER WITH A VARIABLY CONTROLLABLE MODULATION FREQUENCY

BACKGROUND OF THE INVENTION

The field of the present invention is lasers and their method of use, and more particularly, pulsed lasers and their use in medical, dental, and industrial applications.

Recently, a number of pulsed lasers have been developed for use in medical, dental, and industrial applications. For example, those skilled in the art will note that pulsed laser systems are commonly provided in three forms: flashlamp pumped free-running, flashlamp pumped electro-optically (E-O) Q-switched, and continuously pumped acousto-optically (A-O) Q-switched. Further, it will be noted by those skilled in the art that the neodymium doped yttrium aluminum garnet (Nd:YAG) laser, a laser which has been adapted for use in numerous medical and dental applications, is exemplary of pulsed laser systems.

When the Nd:YAG laser is provided as a flashlamp pumped free-running system, a flashlamp pulse having a duration typically between 100 and 1000 $\mu s$ pumps the Nd:YAG rod of the laser, and a laser output pulse of approximately the same duration is produced. Flashlamp pulse energies are commonly in the 1–1000 mJ range, and for this reason the maximum peak laser output power of a flashlamp pumped free-running system is typically 10 kW.

For certain applications, however, those skilled in the art will note that peak output powers greatly exceeding 10 kW may be desired, and that, in response to this need, a number of flashlamp pumped E-O Q-switched Nd:YAG lasers have been developed. The flashlamp pumped E-O Q-switched Nd:YAG laser utilizes an electro-optical Q-switch to disrupt beam oscillation within the oscillating cavity of the laser during the entire duration of each flashlamp pulse, and to restore beam oscillation immediately following each flashlamp pulse. In this fashion, substantially all of the flashlamp pulse energy is stored in the Nd:YAG rod during the duration of each flashlamp pulse, and upon the restoration of beam oscillation within the oscillating cavity a "giant pulse" laser output is produced. More specifically, as beam oscillation is restored, substantially all of the energy stored within the Nd:YAG rod is extracted from the rod in the form of a single giant pulse having a duration of approximately 10 ns. In this way, laser output pulses having peak powers in the range of 100 MW may be readily-produced. Unfortunately, laser output pulses having peak powers in the 100 MW range are not useful in many applications, and in particular, laser output pulses having peak powers in 100 MW range cannot be carried by conventional fiber optic delivery systems. While laser output pulses having lower peak powers may be obtained from a flashlamp pumped E-O Q-switched Nd:YAG laser by reducing the amount of energy contained in each flashlamp pump pulse, the inability of E-O Q-switches to operate at high repetition rates (i.e. 1 kHz or better) makes it impractical to achieve desirable peak powers while at the same time maintaining an average laser output power of between 5 and 50 W.

Finally, in contrast to flashlamp pumped Nd:YAG pulsed lasers, continuously pumped A-O Q-switched Nd:YAG pulsed lasers, such as the laser disclosed and claimed in U.S. Pat. No. 4,273,535, issued to Yamamoto et al., and entitled "Device for Preventing Tooth Decay by Laser Beam Irradiation and Method of Preventing Tooth Decay by Means of the Same," typically utilize an arc lamp to continuously pump the Nd:YAG rod, and utilize an A-O Q-switch to periodically trigger energy storage and release by the Nd:YAG rod. The storage time and pulse repetition rate can be adjusted over a broad range. However, to maximize laser output pulse peak powers it is necessary to maximize energy storage within the Nd:YAG rod prior to switching. This is accomplished by setting the rate of triggering in accordance with the lifetime of the excited state of the Nd:YAG rod. However, those skilled in the art will appreciate that, as the pulse repetition rate is reduced, the efficiency of the laser is sacrificed, and again it becomes impractical to generate laser output pulses having desirable peak powers, while at the same time maintaining an average laser output power in the range of 5–50 W.

Because it is desirable in many applications to generate laser output pulses having peak powers in the 10–200 kW range, while at the same time maintaining laser efficiency of 1 to 2% or more and maintaining a pulse repetition rate in the range of 10–200 Hz, a new laser system is desired.

SUMMARY OF THE INVENTION

The present invention is directed to an intracavity modulated pulsed laser and its use. The intracavity modulated pulsed laser is capable of generating output pulses having controllable peak powers in, for example, the 10–100 kW range, is capable of maintaining a high average power output, and is capable of delivering laser radiation in the form of low frequency bursts. In one preferred form, the intracavity modulated pulsed laser comprises an amplification medium, a pulsed pumping source, a modulator, and two mirrors, one totally reflective and one partially reflective. The amplification medium is disposed along an optical axis between the two mirrors. The pulsed pumping source, which may comprise, for example, a standard flashlamp, is disposed adjacent the amplification medium for delivering pulses of pump energy to the amplification medium and exciting the atoms which comprise the amplification medium to elevated quantum-mechanical energy levels. The intracavity modulator modulates the amplification of a beam oscillating between the mirrors at predetermined intervals during each pulse of energy delivered to the amplification medium by the pulsed pumping source. In this fashion, rather than generating a conventional single laser output pulse in response to each pump pulse delivered by the pumping source, the intracavity modulated pulsed laser generates an output burst comprising a plurality of sub-pulses in response to each pump pulse delivered by the pumping source. Thus, when a plurality of pump pulses are sequentially delivered from the pulsed pumping source to the amplification medium, the intracavity modulated pulsed laser of the present invention will produce an output comprising a plurality of grouped sub-pulses or, stated differently, a plurality of multi-pulsed bursts. The sub-pulses of each output burst have substantially increased and controllable peak powers. To control the peak powers of the sub-pulses comprising each burst, the frequency of modulation is varied, and as long as the duration of the period between amplification triggering does not approach the lifetime of the excited state of the amplification medium, the efficiency of the intracavity modulated pulsed laser is not sacrificed.

It follows that the intracavity modulated pulsed laser embodying a preferred form of the present invention is both efficient and capable of generating an output comprising a plurality of multi-pulsed bursts having substantially increased and controllable peak powers. Further, because the peak powers of the multi-pulsed bursts are controllable, compatibility between a laser embodying a preferred form of the present invention and fiber optic delivery systems may be readily achieved. More specifically, by varying the modulation frequency of an intracavity modulated pulsed laser, the maximum peak powers of the output bursts generated by the laser may be controlled in accordance with the power tolerance (power density damage threshold) of various fiber optic delivery systems.

Accordingly, it is an object of the present invention to provide an improved laser which is both efficient and capable of delivering an output comprising a plurality of output bursts having substantially increased and controllable peak powers.

It is another object of the present invention to provide for utilization in medical, dental, and industrial applications an improved laser which is capable of efficiently generating an output comprising a plurality of output bursts having controllable peak powers.

It is still another object of the present invention to provide a method for treating, e.g. cutting, ablating, and coagulating, soft tissues using multi-pulsed bursts of laser energy.

It is yet another object of the present invention to provide a method for treating hard tissues using multi-pulsed bursts of laser energy.

BRIEF DESCRIPTION OF THE DRAWINGS

FIG. 6(a) illustrates a low energy flashlamp pump pulse and a multi-pulsed burst laser output which may be produced therefrom, and FIG. 6(b) illustrates a high energy flashlamp pump pulse and a multi-pulsed burst laser output which may produced therefrom.

DESCRIPTION OF THE PREFERRED EMBODIMENTS

Figure 1:
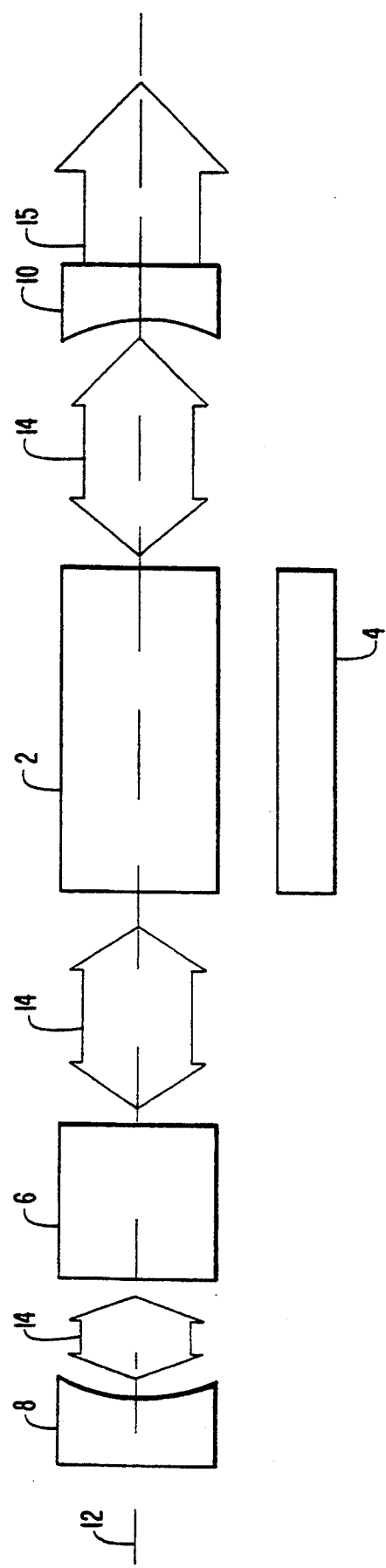
FIG. 1 is a block diagram of an intracavity modulated pulsed laser in accordance with one form of the present invention.

Turning to the drawings, FIG. 1 is a block diagram of an intracavity modulated pulsed laser 1 in accordance with the present invention. As shown, the laser 1 comprises an amplification medium 2, a pulsed pumping source 4, a modulator 6, a totally reflective mirror 8, and a partially reflective mirror 10. The amplification medium 2 is disposed along an optical axis 12 between the two mirrors 8 and 10, and the pulsed pumping source 4, which may comprise, for example, a conventional flashlamp, is disposed adjacent the amplification medium 2 for delivering pulses of pump energy to the amplification medium 2 and exciting the atoms which comprise the amplification medium 2 to elevated quantum-mechanical energy levels. As the atoms comprising the amplification medium return to their initial or lower quantum-mechanical energy levels, photons of predetermined wavelengths will be spontaneously emitted by those atoms, and a number of the spontaneously emitted photons will trigger further photon emissions ("stimulated emissions"). A number of the stimulated emissions will then form a beam 14 which oscillates between the mirrors 8 and 10. Finally, the oscillation of the beam 14 between the mirrors 8 and 10 will trigger further stimulated emissions which will cause the beam 14 to be amplified.

Figure 2:
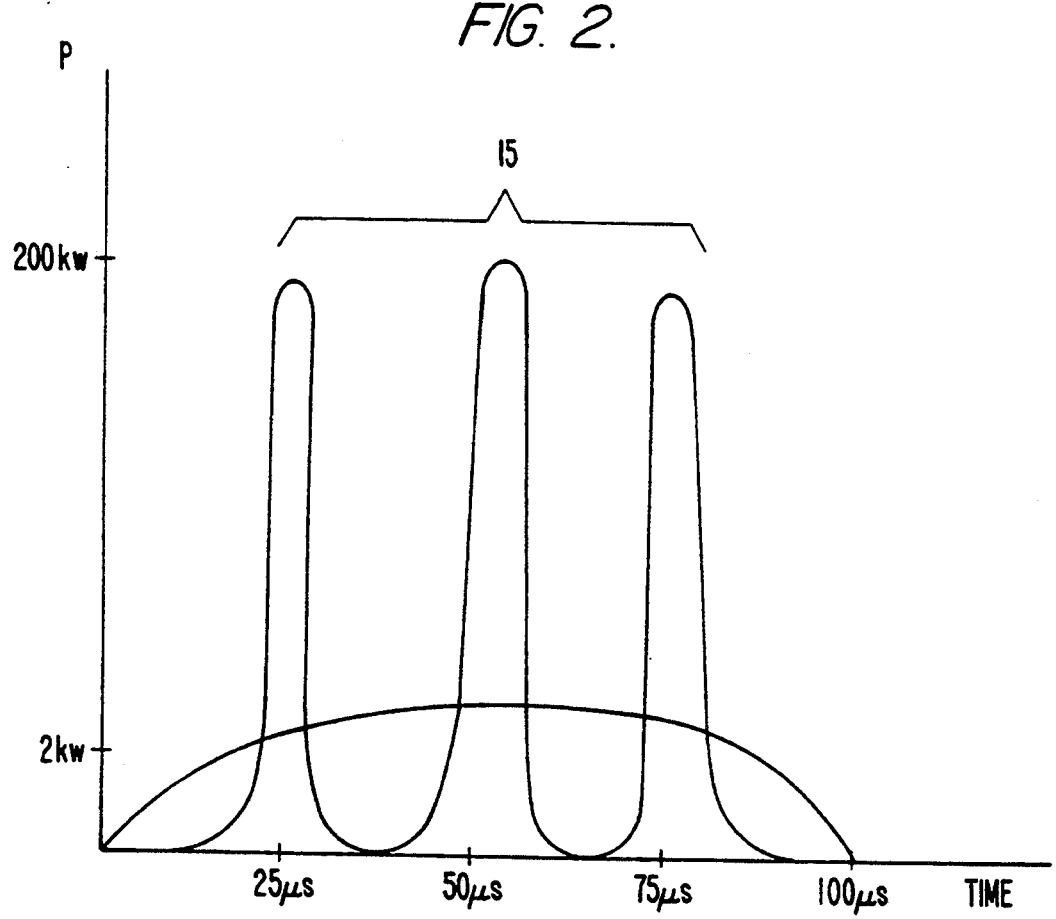
FIG. 2 illustrates the relationship between a conventional flashlamp pump pulse and a burst output which may be produced therefrom in accordance with the present invention.

The modulator 6, which may comprise for example an acousto-optical Q-switch or a saturable absorber dye, is also disposed along the optical axis 12 between the mirrors 8 and 10. The modulator 6 functions to reduce stimulated emissions within the amplification medium (i.e. to minimize lasing or amplification of the beam 14 as it travels within the amplification medium) by disrupting the oscillation of the beam 14 between the mirrors 8 and 10. This process is commonly referred to as switching the quality or "Q" of a laser oscillator. The modulator 6 also functions to increase the Q of the laser 1 at predetermined intervals within each pulse of energy generated by the pulsed pumping source 4, thus causing oscillation and amplification of the beam 14 at each such interval. By repeatedly modulating the oscillating beam 14 of the laser 1 during each energy pulse generated by the pulsed pumping source 4, substantial population inversions are repeatedly built up within the amplification medium 2, and highly accelerated depletions of those inversions are triggered upon increasing the Q of the laser 1. In this manner, a laser output 15 comprising one or more multi-pulsed bursts having peak powers in the range of 10–200 kilowatts may be readily generated. Further, as long as the interval between the sub-pulses comprising each multi-pulsed burst does not approach the lifetime of the excited state of the amplification medium 2 of the laser 1, spontaneous emission energy losses will be minimized, and the efficiency of the laser 1 will not be sacrificed. The relationship between a typical flashlamp pump pulse 11 and an exemplary multi-pulsed burst laser output 15 which may be produced therefrom is illustrated in FIG. 2.

Figure 3:
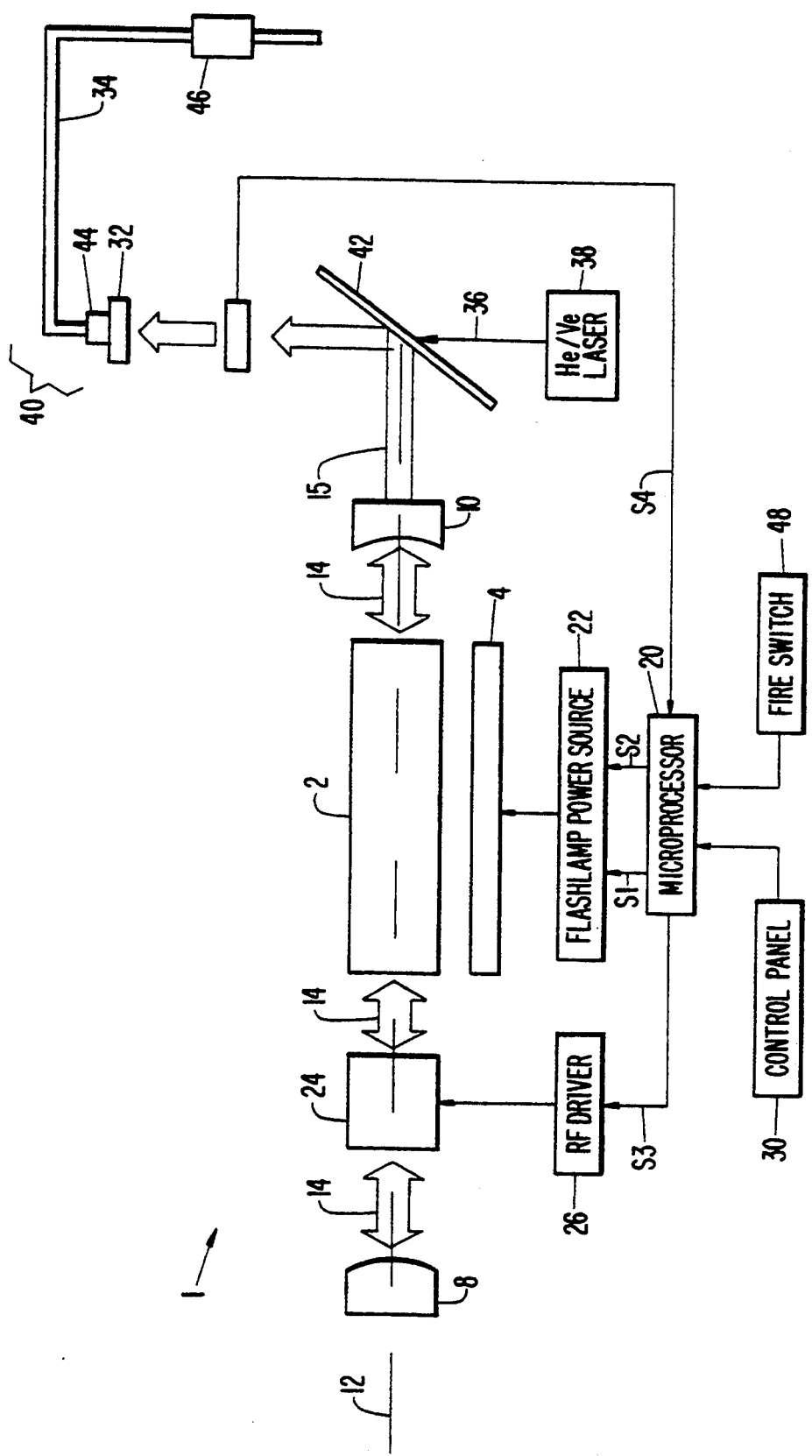
FIG. 3 is a block diagram of an intracavity modulated pulsed laser in accordance with a preferred from of the invention.

Turning now to FIG. 3, in a preferred form the amplification medium 2 of the intracavity modulated pulsed laser 1 comprises a standard, 1% neodymium doped, yttrium aluminum garnet rod (Nd:YAG rod) measuring 5 mm in diameter and 80 mm in length. The dimensions of the Nd:YAG rod will vary, however, depending upon the average power output and depending upon the particular beam diameter which is desired from the laser 1. It will also be noted that Nd:YAG rods of the type described may be purchased from any one of a number of laser component distributors including Lightning Optical of Tarpon Springs, Fla. Further, it is presently preferred to apply a single layer anti-reflective (AR) coating to the ends of the Nd:YAG rod. The AR coating may be centered at any one of a number of wavelengths including, for example, 1.064 $\mu$m, 1.320 $\mu$m, and 1.440 $\mu$m, depending upon the anticipated field of use of the laser 1. Although testing is ongoing, the 1.064 $\mu$m and the 1.320 $\mu$m wavelengths have demonstrated utility in hard and soft tissue applications. However, the utilization of amplification mediums other than neodymium doped yttrium aluminum garnet crystal may require the utilization of AR coatings centered at other wavelengths. For example, it might be desirable to coat the ends of an erbium doped yttrium aluminum garnet rod with an AR coating centered at 2.910 $\mu$m.

With respect to the pulsed pumping source 4, a 450 Torr Xenon flashlamp is presently preferred. Flashlamps of this type are available from ILC, Inc., of Sunnyvale, Calif., and the ILC Model L7652 is preferred. The energy delivered to the Nd:YAG rod 2 by the flashlamp 4 is controlled by a microprocessor 20 which is coupled to the flashlamp power source 22. The microprocessor 20 may comprise, for example, an Intel Model ADC 31 with EEPROM and interface elect, and as illustrated, the microprocessor 20 delivers two signals S1 and S2 to the flashlamp power source 22. The first signal S1 controls the amount of energy which is delivered from the power source 22 to the flashlamp 4 and, in turn, the amount of energy which is delivered from the flashlamp 4 to the Nd:YAG rod 2. The second signal S2 triggers the discharge of the flashlamp power source 22 and, thus, controls the timing or repetition rate of the pulses generated by the flashlamp 4.

Figure 4:
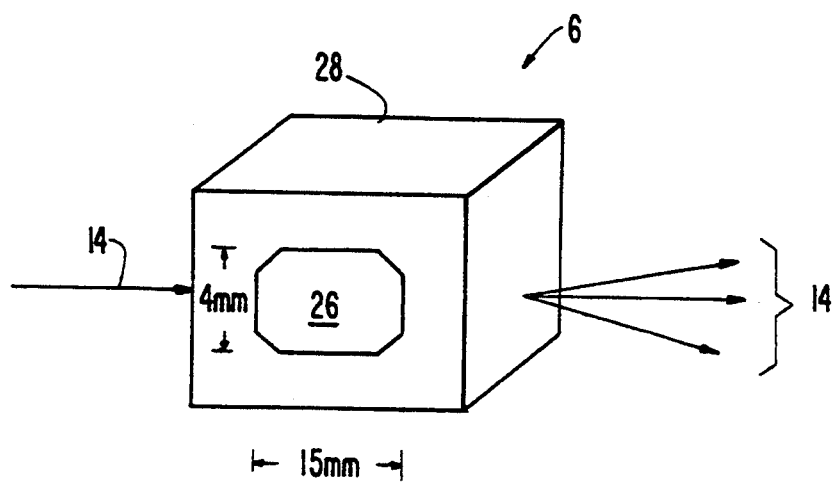
FIG. 4 is an illustration of an acousto-optical Q-switch in accordance with a preferred form of the present invention.

Referring now also to FIG. 4, in a preferred form the beam modulator 6 of the intracavity modulated pulsed laser 1 comprises an acousto-optical Q-switch 24. In particular, it is presently preferred to use an acousto-optical Q-switch comprising a lithium niobate (LiNbO$_3$) transducer 26 bonded to an SF10 glass crystal 28. Acousto-optical Q-switches of this type may be purchased, for example, from Neos, Inc., of Melbourne, Fla. However, it should be noted that numerous other acousto-optical Q-switches, including standard quartz switches, may be utilized. Further, while it is generally accepted that the acoustic aperture of the crystal 28 should match the diameter of the oscillating beam 14, it has been found that the acousto-optical Q-switch 24 operates more efficiently if a slightly smaller acoustic aperture is used. An acoustic aperture measuring 4 mm by 15 mm is presently preferred.

Figure 5:
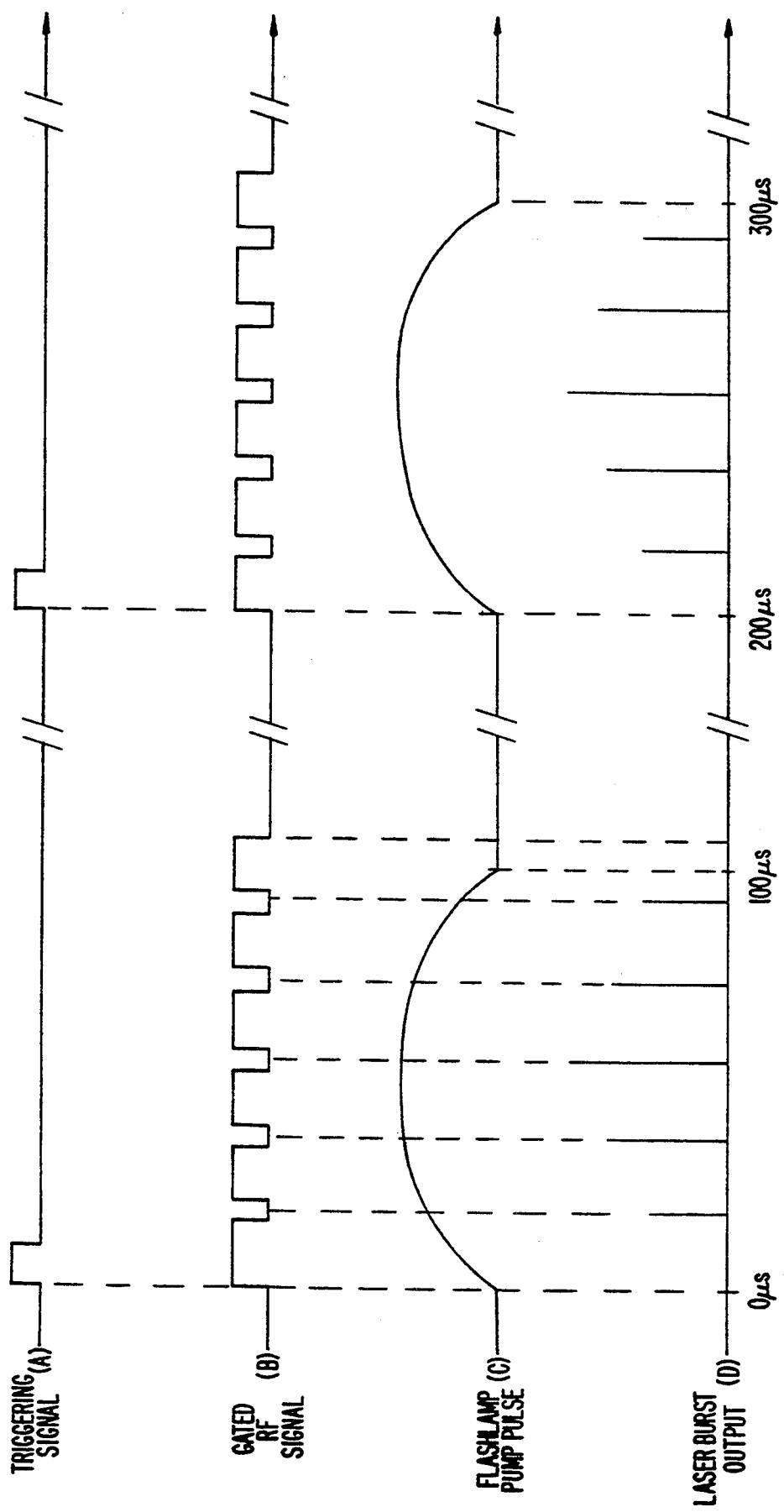
FIG. 5 is a timing diagram illustrating the relationship between flashlamp triggering, RF signal gating, flashlamp discharge, and laser output in an intracavity modulated pulsed laser in accordance with a preferred form of the present invention.

Turning now also to the timing diagram depicted in FIG. 5, the modulator 6 is preferably driven at a frequency of 27.12 Mhz by a RF driver 26. RF drivers capable of sustaining a 27.12 Mhz drive frequency at 10 watts peak power are available, for example, from Neos, Inc., of Melbourne, Fla. The initial activation and gating of the RF driver 26 is preferably controlled by the microprocessor 20. For example, as shown in FIG. 5, in each instance that the microprocessor 20 delivers a trigger signal S2 (shown as waveform A) to the flashlamp 4 causing the flashlamp 4 to discharge a pump pulse 11, the microprocessor simultaneously delivers a gated RF driver signal S3 (shown as waveform B) to the RF driver 26 and the gated RF driver signal S3 switches the RF driver ON and OFF at predetermined intervals during the period of the flashlamp pump pulse 11 (shown as waveform C). In a preferred form, the period of the flashlamp discharge pulse 11 is approximately 100 $\mu$s, and the gating frequency of the RF driver signal S3 is set between 50 kHz and 300 kHz. Thus, a laser output 15 (shown as waveform D) comprising a multi-pulsed burst of between 5 and 30 sub-pulses is produced from each flashlamp pump pulse 11. Importantly, by varying the gating frequency of the RF driver signal S3, it is possible to control the peak powers of the multi-pulsed bursts which comprise the laser output 15. For this reason, in the presently preferred form, the gating frequency of the RF driver signal S3 is controlled by the microprocessor 20. Specifically, in the presently preferred form the microprocessor 20 determines an optimum gating frequency based on preset peak power and gating frequency information which is stored in its memory. The optimum gating frequency of the preferred embodiment is the frequency at which the peak power of the largest sub-pulse in a multi-pulsed burst attains a prescribed threshold level L1 just below the power density damage threshold level DT of a fiber optic delivery system 40 used in conjunction with the intracavity modulated pulsed laser 1.

Figure 6B:
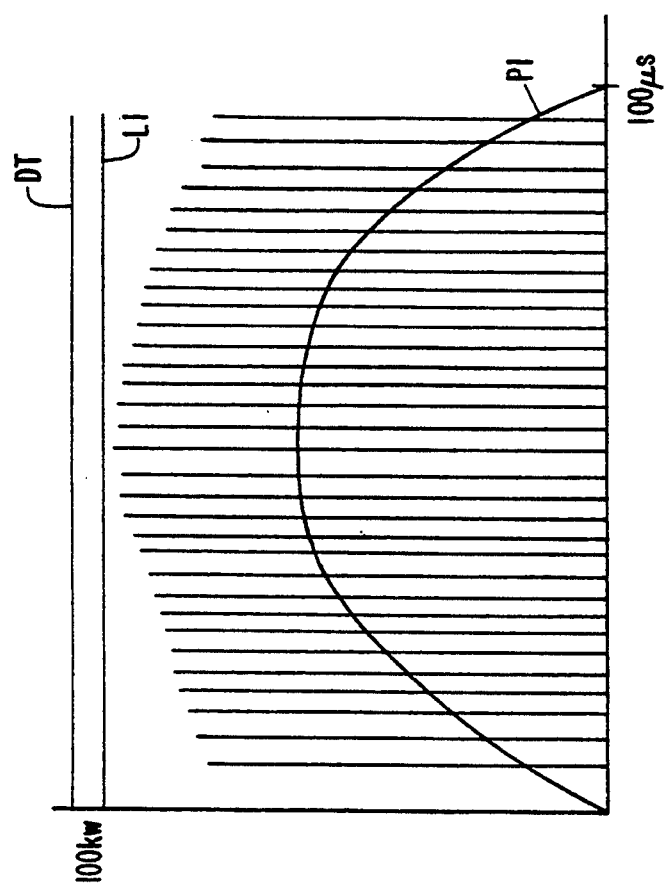
FIGS. 6(a) and 6(b) illustrate how output sub-pulse peak powers are controlled by varying the modulation frequency of an intracavity modulated pulsed laser to achieve compatibility with a fiber optic delivery system having a given power density damage threshold (DT). In particular.
Figure 6A:
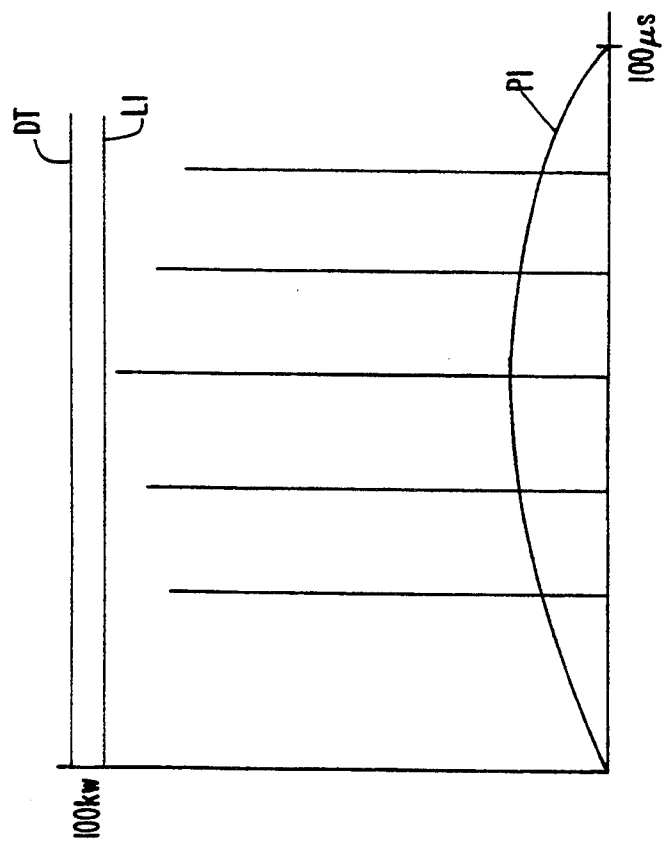

An exemplary relationship between the amount of pump pulse energy delivered by the flashlamp 4 to the Nd:YAG rod 2 and the optimum gating frequency of the RF driver signal S3 for use with a fiber optic delivery system having a given power density damage threshold DT is illustrated in FIGS. 6(a) and 6(b). As shown in FIG. 6a, if a small pump pulse, for example, a 50 mJ pulse pump, is delivered from the flashlamp 4 to the Nd:YAG rod 2, and the fiber optic damage threshold DT comprises 100 kW, the frequency of the RF gating signal S3 will be set by the microprocessor 20 to approximately 50 kHz. If on the other hand, as shown in FIG. 6(b), a large pump pulse, for example, a 320 mJ pump pulse, is delivered from the flashlamp 4 to the Nd:YAG rod 2 in the same system, the frequency of the RF gating signal S3 will be set by the microprocessor 20 to approximately 320 kHz. Thus, it will be appreciated that to maintain a given peak power threshold level L1 the optimum gating frequency of the RF driver will be increased as the amount of energy contained in each pump pulse P1 is increased, and the optimum gating frequency of the RF driver will be decreased as the amount of energy contained in each pump pulse P1 is decreased. It follows that by reprogramming the microprocessor 20 compatibility between the intracavity modulated pulsed laser 1 and virtually any fiber optic delivery system 40 may be readily achieved.

Figure 7:
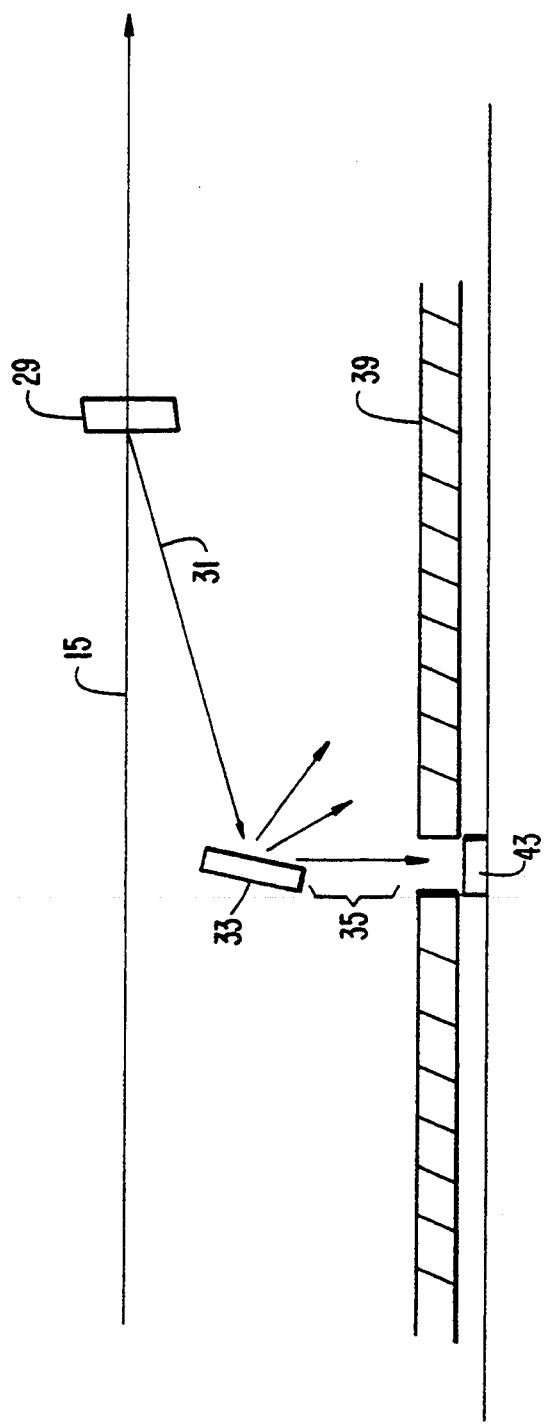
FIG. 7 is an illustration of an energy monitor in accordance with a preferred form of the present invention.
Figure 8:
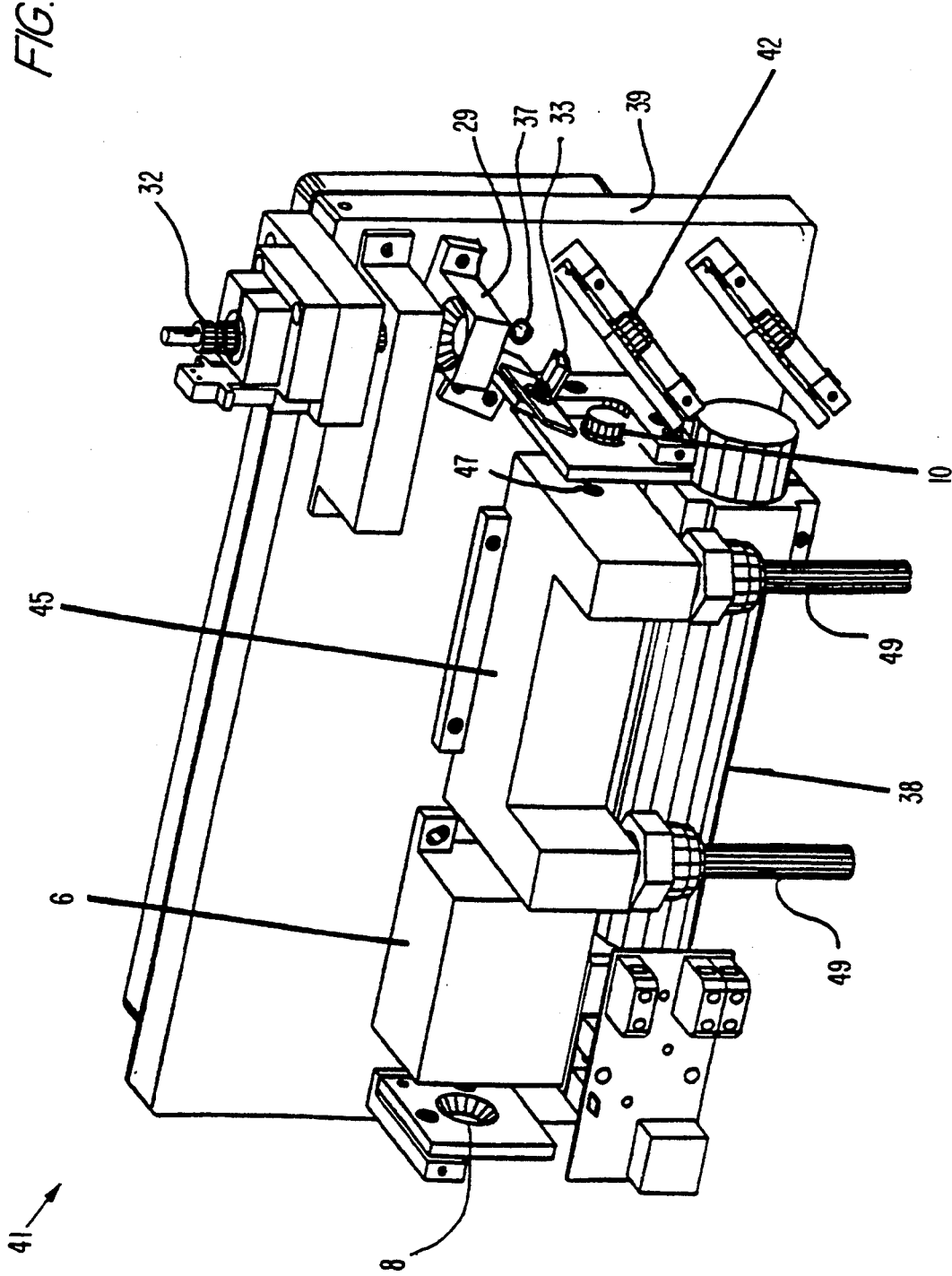
FIG. 8 is an illustration of a laser head embodying a preferred form of the present invention.

Turning again to FIG. 3, in a preferred form a beam energy monitor 27 is utilized to measure the energy contained in each output burst 15 generated by the intracavity modulated pulsed laser 1 and to provide feedback to the microprocessor 20. This enables the microprocessor 20, in response to variations which may occur over time between anticipated laser output energies and actual laser output energies, to automatically adjust the amount of energy which is delivered from the flashlamp power source 22 to the flashlamp 4 at a given pump pulse energy setting. A presently preferred energy monitor is illustrated in FIGS. 7 and 8 and comprises a shallow angle beam splitter 29, which picks off roughly 4% of the laser output beam 15 forming a sampled beam 31, and directs the sampled beam 31 toward an alumina diffuser 33. The alumina diffuser 33 diffuses the sampled beam 31 forming a diffused beam 55, and a position of the diffused beam 35 passes through a hole 37 located in the base plate 39 of the laser head 41 and strikes a germanium diode 43. The germanium diode 43, upon being struck by the diffused beam 35, generates a current which is proportional to the intensity of the diffused beam 35, and the generated current is integrated over time and digitized by an electronic integrator (not shown). It will be noted by those skilled in the art that in this fashion the laser output beam 15 is integrated spatially by the diffuser 33 and temporally by the electronic integrator. Thus, the resulting signal S4, which is delivered to the microprocessor 20, is proportional to the laser output burst energy and is independent of pulsewidth and spatial variation.

Figure 10:
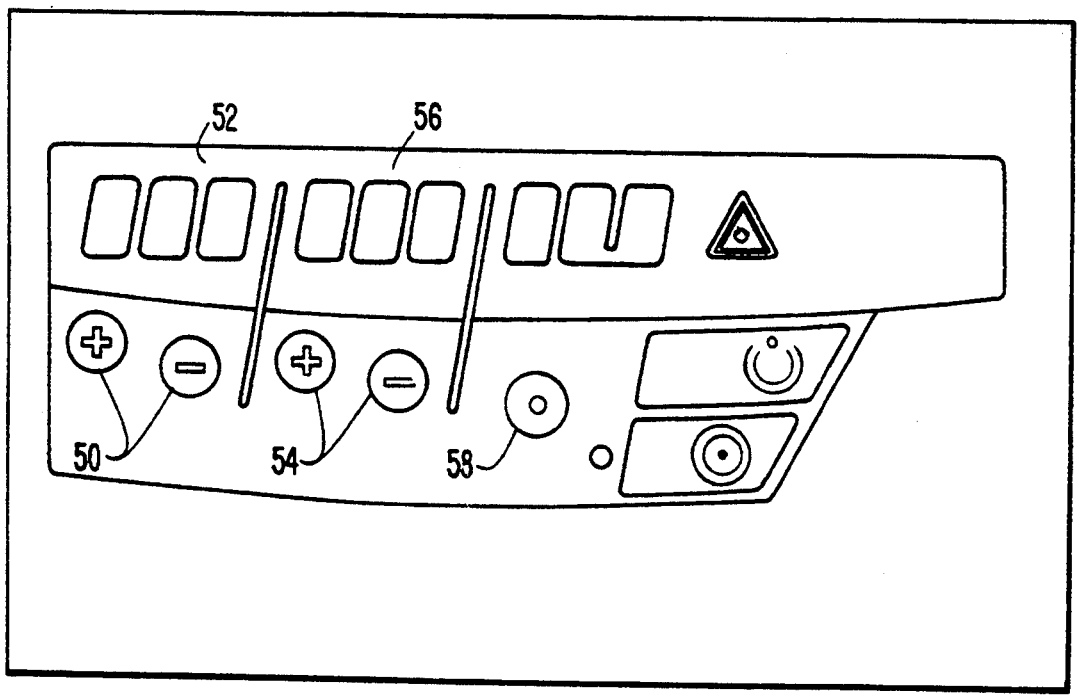
FIG. 10 is an illustration of a control panel of an intracavity modulated pulsed laser in accordance with a preferred form of the present invention.

As shown in FIGS. 3 and 10, in a preferred form a control panel 30 is provided for conveying information indicative of a desired laser output burst energy and a desired burst repetition rate to the microprocessor 20. The control panel 30 is under the control of a second microprocessor (not shown), which is coupled to the control system microprocessor 20 by conventional means.

As for the mirrors 8 and 10, it is presently preferred that the totally reflective mirror 8 comprise a convex mirror 10 having a radius of curvature of approximately 50 cm, and that the partially reflective mirror comprise a concave mirror having a radius of curvature of approximately 60 cm. The utilization of a concave/convex mirror arrangement minimizes variations in the diameter of the oscillating beam 14, as the amount of energy delivered to the Nd:YAG rod 2 by the flashlamp 4 increases. In doing so, the concave/convex mirror arrangement minimizes potential damage to the input face (not shown) of the optical fiber 34. In addition, depending upon the anticipated field of use of the intracavity modulated pulsed laser 1, it is presently preferred to coat the mirrors with a multi-layer dielectric V coating. As set forth above in the discussion concerning the AR coatings deposited over the ends of the Nd:YAG rod 2, the multi-layer dielectric V coating may be centered at any of a number of wavelengths, including 1.064 µm, 1.320 µm, and 1.440 µm. Further, for soft tissue applications, coatings centered at 1.064 µm and 1.320 µm have demonstrated utility, whereas for certain hard tissue applications, such as the vaporization of dental enamel, a coating centered at 1.320 µm is presently preferred. It should be noted, however, that the precise coating used will depend upon the particular amplification medium utilized by the system, and that for this reason the identification of particular preferred wavelengths is not intended to limit the scope of the invention in any way. With respect to the reflectivity of the mirrors 8 and 10, it is presently preferred to coat the totally reflective mirror 8 with a multi-layer dielectric V coating having a reflectivity of 99.5% or better. The partially reflective mirror should be coated with a multi-layer dielectric V coating having a reflectivity of approximately 60% if a laser output beam 15 having a wavelength of 1.064 µm is desired, and a reflectivity of 90% if a laser output beam 15 having a wavelength of 1.320 µm is desired.

Because it is anticipated that various embodiments of the intracavity modulated pulsed laser 1 will be employed in medical and dental applications, and because neither beams having a wavelength of 1.064 µm nor beams having a wavelength of 1.320 µm are visible to the human eye, in a preferred form the laser output beam 15 is combined with a visible aiming beam 36 generated by a helium neon (HeNe) laser 38 using a conventional beam combining mirror 42. Thus, to focus the output beam 15 of the laser 1 at a specified tissue area a practitioner using the laser 1 may merely focus the visible aiming beam 36 at that tissue area.

As shown in FIG. 8, which provides an illustration of a laser head 41 in accordance with a preferred form of the present invention, it is presently preferred to house the flashlamp 4 and the Nd:YAG rod 2 within an optical pump chamber 45 having a pair of optical openings 47 disposed along the optical axis 12 (shown in FIGS. 1 and 3). The optical pump chamber 45, in addition to providing a housing for the Nd:YAG rod 2 and the flashlamp 4, provides a conventional coolant flow system 49 which receives coolant (e.g. water) from a cooling system (not shown) and delivers that coolant to the Nd:YAG rod 2 and the flashlamp 4. Optical pump chambers of the type disclosed herein may be purchased, for example, from Big Sky Laser in Bozeman, Mont.

Now, turning to a discussion of a number of exemplary applications for an intracavity modulated pulsed laser in accordance with a preferred form of the invention, it is presently anticipated that intracavity modulated pulsed lasers, such as those described above, will meet a number of needs in the fields of medicine and dentistry, as well as in numerous other fields. Moreover, it is submitted that intracavity modulated pulsed lasers, such as those described above, will be found useful in any field which requires an efficient laser capable of delivering output pulses having increased or controllable peak powers.

With respect to the medical and dental fields, the utility of the Nd:YAG laser has already been demonstrated. Specifically, it has been found that for numerous applications the Nd:YAG laser can be a highly effective tool. In part, this is because the 1.064 µm beam which is produced by the Nd:YAG laser may be carried with minimal energy losses by standard optical fibers. The difficulty which has been encountered by prior art systems, however, is that those systems have been unable to maintain a high average power output, while at the same time delivering laser output pulses which have increased peak powers and may be transmitted using conventional fiber optic delivery systems. For this reason treatment, including tissue vaporization and ablation, using the systems of the prior art requires substantial time. In contrast, because an intracavity modulated pulsed laser maintains a high average power output while at the same time providing laser output pulses having increased peak powers, tissue vaporization and ablation, for example, using an intracavity modulated pulsed laser proceeds at a much more rapid rate. In addition, because the intracavity modulated pulsed laser delivers multi-pulsed energy bursts to an area of tissue to be treated, thermal damage to adjacent tissues is minimized.

As set forth above, when using an intracavity modulated pulsed laser for treating hard and soft tissue disorders, it is preferable to couple the intracavity modulated pulsed laser to a fiber optic delivery system 40. Fiber optic delivery systems 40 generally comprise a optical fiber 34 which is coupled to a standard SMA 905 connector 44 at one end, and which has a conventional laser hand piece 46 coupled to the other end. The connector 44 is adapted to engage the fiber coupler 32 (shown in FIGS. 3 and 8) such that both the aiming beam 36 and the laser output beam 15 may be carried by the fiber 34 to the hand piece 46. Hand pieces 46 are generally of one of two types, contact and non-contact. If a non-contact hand piece is utilized, the beams 15 and 36 are generally deflected at a prescribed angle and focused at a prescribed distance from the hand piece 46 by conventional means. To aim the laser output beam 15 using a non-contact handpiece a practitioner must only direct the visible aiming beam 36 toward a prescribed tissue area. Once this is accomplished, the laser 1 may be "fired" activated by depressing the "fire" switch 48. If, on the other hand, a contact hand piece is utilized, the beams 15 and 36 will be delivered to a contact tip (not shown), and when the contact tip is placed in contact with a prescribed tissue area, the beams 15 and 36 will be delivered directly to that tissue area at the point of contact. Thus, when using a hand piece of the contact variety, the practitioner may commence firing the laser either prior to or after bring the contact tip into contact with a desired tissue area.

Figure 9:
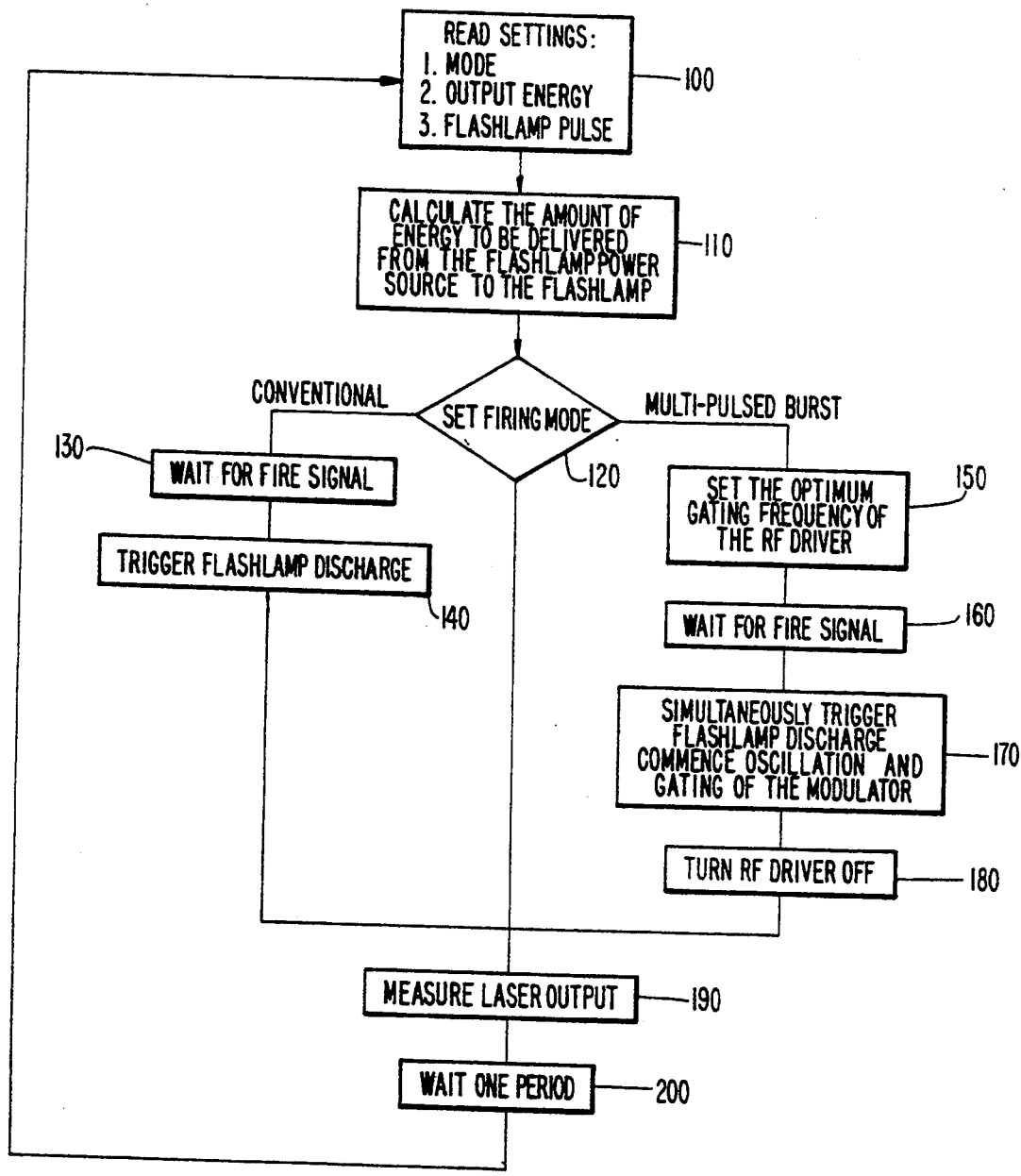
FIG. 9 is a flowchart illustrating the sequence of functions performed by a microprocessor in controlling an intracavity modulated pulsed laser in accordance with a preferred form of the present invention.

In each instance of firing, in a preferred form the microprocessor 20 will proceed through the steps set forth in FIG. 9. Specifically, the microprocessor 20 will perform an initialization step (100) by reading the mode setting, the output energy setting, and the flashlamp pulse repetition rate setting, all of which are manually entered by the operator. The mode setting determines whether a conventional pulsed laser output or a multi-pulsed burst output will be delivered by the intracavity modulated pulsed laser. The output energy setting determines the amount of energy which will be delivered by the laser 1 within each conventional output pulse or each multi-pulsed output burst (depending upon the mode setting). The flashlamp pulse repetition rate setting determines the number of flashlamp pulses per second which will be delivered by the flashlamp 4 to the Nd:YAG rod 2 during continuously repeated firings of the laser.

After initialization (100), the microprocessor 20 will perform flashlamp energy calculation step (110). Specifically, the microprocessor calculates and sets the amount of energy to be delivered from the flashlamp power source 22 to the flashlamp 4. This calculation is performed based on information stored in a look-up table, which is stored in the memory of the microprocessor 20. The information in the look-up table is based on a correction factor which is determined based on the previous output energy setting and the actual amount of energy delivered by the laser 1 within each conventional output pulse or each multi-pulsed burst as the case may be. The actual amount of energy delivered by the laser 1 is measured by the energy monitor 27. In this fashion, the microprocessor 20 compensates for changes in laser efficiency which will occur over time.

Next, the microprocessor 20 will set the firing mode of the laser (120) to a conventional or a multi-pulsed burst setting in accordance with previously read mode information. When conventional mode has been selected, the microprocessor 20 will wait to receive a fire signal from the fire switch 48 (130), and after receiving the fire signal from the fire switch 48, the microprocessor will trigger a flashlamp pulse (140). If the multi-pulsed burst output mode has been selected, the microprocessor 20 will set the optimum gating frequency of the RF driver signal S3 (150), and wait for a fire signal from the fire switch 48 (160). Upon receiving a fire signal from the fire switch 48, the microprocessor 20 will, as shown in FIG. 5, simultaneously trigger a flashlamp pulse and commence the oscillation and gating of the modulator 6 (170). After the flashlamp pulse has passed, the microprocessor 20 will turn off the oscillation and gating of the modulator 6 (180). In either mode, the laser output energy will be measured by the energy monitor 27, and a signal 54 indicative of the laser output energy will be provided by the energy monitor 27 to the microprocessor 20 (190). The microprocessor 20 will then wait for one pulse period (step 200) and repeat the sequence.

Turning now also to FIG. 10, in a preferred form the desired laser output burst energy setting and flashlamp pulse repetition rate setting are conveyed to the microprocessor 20 by the control panel 30. As shown in FIG. 10, the burst energy setting may be adjusted by manipulating a pair of buttons 50 labeled (+) and (−) which are located just below the pulse energy display 52 on the control panel 30. The pulse repetition rate may be adjusted by manipulating a pair of buttons 54 labeled (+) and (−) which are located just below the pulse repetition rate display 56 on the control panel 30. The multi-pulsed burst mode may be selected by depressing a button 58 labeled accordingly. In the presently preferred form, the burst energy setting may be set between 30 mJ and 320 mJ, and the flashlamp pulse repetition rate may be set between 10 Hz and 100 Hz.

Assuming that a pump pulse having a duration of approximately 100 $\mu s$ is delivered by the flashlamp 4 to the Nd:YAG rod 2, suggested burst or pulse energy settings, pulse repetition rate settings, mode settings, and RF gating frequencies (if applicable) for various soft tissue applications (including incision, excision, ablation, and coagulation) are set forth in Table 1.

TABLE 1

| APPLICATION | MODE | ENERGY (mJ) | RATE (Hz) | AVG POWER (W) | RF GATING FREQUENCY |
|---|---|---|---|---|---|
| Incision | Multi-pulsed/ | 100–250/ | 30–50/ | 5–10/ | 100–250 kHz/ |
|  | Conventional | 100–250 | 30–50 | 5–10 | Off |
| Excision | Multi-pulsed/ | 100–250/ | 30–50/ | 5–10/ | 100–250 kHz/ |
|  | Conventional | 100–250 | 30–50 | 5–10 | Off |
| Ablation | Multi-pulsed/ | 30–100/ | 50–100/ | 3–10/ | 30–100 kHz/ |
|  | Conventional | 30–100 | 50–100 | 3–10 | Off |
| Coagulation | Conventional | 30–100 | 30–100 | 3–10 | Off |

Assuming that a pump pulse having a duration of approximately 100 μs is delivered by the flashlamp 4 to the Nd:YAG rod 2, suggested burst or pulse energy settings, flashlamp pulse repetition rate settings, pulse mode settings, and RF gating frequencies for hard tissue ablation are set forth in Table 2.

TABLE 2

| APPLICATION | MODE | ENERGY (mJ) | RATE (Hz) | AVG POWER (W) | RF GATING FREQUENCY (kHz) |
|---|---|---|---|---|---|
| Ablation | Multi-pulsed | 100–320 | 30–100 | 3–10 | 100–320 |
| Ablation | Conventional | 200–320 | 30–100 | 6–10 | Off |

Finally, with respect to certain hard tissue applications and, in particular, with respect to the ablation of hard tissue, i.e., the drilling of holes in dental enamel, it appears, based on experimentation to date, that it may be preferable to utilize a beam having a wavelength of 1.320 μm. However, because not all fibers are capable of efficiently carrying a beam having a wavelength of 1.320 μm, it is preferable to utilize a low OH$^-$ fiber to carry the laser output beam 15 to the hand piece 46. Fibers of this type are available, for example, from Poly Micro Technologies, Inc., of Phoenix, Ariz., and model number FIP 200/220/240 is presently preferred.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A laser comprising:
    a first reflective surface and a second reflective surface disposed along an optical axis;
    an amplification medium disposed along said optical axis between said first and second reflective surfaces;
    a pulsed pumping means disposed adjacent said amplification medium for delivering energy pump pulses to said amplification medium;
    a modulator having a variably controllable frequency disposed along said optical axis between said amplification medium and one of said reflective surfaces, said modulator being adapted to switch a beam generated by said amplification medium at a selected frequency such that said laser, upon the delivery of each pump pulse to said amplification medium, produces an output burst comprising a plurality of sub-pulses having predetermined peak powers; and
    a control circuit coupled to said modulator for selecting and controlling said switching frequency of said modulator.

2. The laser of claim 1 wherein said modulator comprises an acousto-optical Q-switch which is driven by an RF driver under microprocessor control.

3. The laser of claim 2 wherein said amplification medium comprises a Nd:YAG rod.

4. The laser of claim 3 wherein said pulsed pumping means comprises a flashlamp.

5. The laser of claim 4 wherein said first reflective surface comprises a totally reflective mirror and said second reflective surface comprises a partially reflective mirror.

6. The laser of claim 5 wherein said totally reflective mirror and said partially reflective mirror are coated with a multi-layer dielectric V coating centered at 1.320 μm, and said Nd:YAG rod has a pair of flat end surfaces which are coated with an anti-reflective coating centered at 1.320 μm.

7. The laser of claim 6 wherein said partially reflective mirror has a reflectivity of approximately 90% and said totally reflective mirror has a reflectivity of at least 99.5%.

8. The laser of claim 5 wherein said totally reflective mirror and said partially reflective mirror are coated with a multi-layer dielectric V coating centered at 1.064 μm, and said Nd:YAG rod has a pair of flat end surfaces which are coated with an anti-reflective coating centered at 1.064 μm.

9. The laser of claim 8 wherein said partially reflective mirror has a reflectivity of approximately 60% and said totally reflective mirror has a reflectivity of at least 99.5%.

10. The laser of claim 5 wherein said partially reflective mirror comprises a concave mirror having a radius of curvature of approximately 60 cm and said totally reflective mirror comprises a convex mirror having a radius of curvature of approximately 50 cm.

11. A laser comprising:
    a first reflective surface and a second reflective surface disposed along an optical axis;
    an amplification medium disposed along said optical axis between said first and second reflective surfaces;
    a pulsed pumping means disposed adjacent said amplification medium for delivering energy pump pulses to said amplification medium;
    a modulator disposed along said optical axis between said amplification medium and one of said reflective surfaces, said modulator being adapted to modulate a beam generated by said amplification medium at a variably controllable modulation frequency such that said laser, upon the delivery of each pump pulse to said amplification medium, produces an output burst comprising a plurality of sub-pulses having predetermined peak powers;
    said modulator comprising an acousto-optical Q-switch which is driven by an RF driver under microprocessor control;
    said acousto-optical Q-switch comprising a lithium niobate transducer bonded to a SF10 glass crystal;
    said lithium niobate transducer being coupled to said RF driver; and
    said acousto-optical Q-switch having an acoustic aperture measuring approximately 4 mm by 15 mm.

12. A laser comprising:
    a totally reflective surface and a partially reflective surface disposed along an optical axis;

an amplification medium disposed along said optical axis between said first and second reflective surfaces;

a pulsed pumping source disposed adjacent said amplification medium, said amplification medium and said pulsed pumping source being disposed in a reflective housing having optical openings along said optical axis;

a pulsed pumping source power supply electrically coupled to said pulsed pumping source;

a modulator having a selectable frequency disposed along said optical axis between said amplification medium and one of said reflective surfaces;

a fire switch; and a control circuit having a first input electrically coupled to said fire switch, a first output electrically coupled to said pulsed pumping source power supply, and a second output electrically coupled to said modulator; said second output carrying signals for setting said selectable frequency of said modulator; and said control circuit including circuitry connected to said first input, which in response to receiving a trigger signal from said fire switch at said first input outputs at said second output at least one multiply gated signal and outputs at said first output at least one discharge signal; said pulsed pumping source power supply, upon receipt of said discharge signal, providing an energy pulse to said pulsed pumping source, and said modulator, upon receipt of said at least one multiply gated signal, modulating a beam generated by said laser at said selectable frequency such that said laser generates an output comprising at least one burst of sub-pulses having predetermined peak powers.

13. The laser of claim 12 wherein said modulator comprises an acousto-optical Q-switch which is driven by an RF driver electrically coupled to said second output of said control circuit.

14. The laser of claim 13 wherein
said acousto-optical Q-switch comprises a lithium niobate transducer bonded to a SF10 glass crystal,
said lithium niobate transducer is coupled to said RF driver, and
said acousto-optical Q-switch has an acoustic aperture measuring approximately 4 mm by 15 mm.

15. The laser of claim 12 wherein said amplification medium comprises a Nd:YAG rod, and wherein said pulsed pumping source comprises a flashlamp.

16. The laser of claim 15 wherein said totally reflective surface comprises a totally reflective mirror and said partially reflective surface comprises a partially reflective mirror.

17. The laser of claim 16 wherein said partially reflective mirror has a reflectivity of approximately 60% and said totally reflective mirror has a reflectivity of at least 99.5%.

18. The laser of claim 17 wherein said totally reflective mirror and said partially reflective mirror are coated with a multi-layer dielectric V coating centered at 1.064 $\mu$m, and said Nd:YAG rod has a pair of flat end surfaces which are coated with an anti-reflective coating centered at 1.064 $\mu$m.

19. The laser of claim 17 wherein said partially reflective mirror comprises a concave mirror having a radius of curvature of approximately 60 cm and said totally reflective mirror comprises a convex mirror having a radius of curvature of approximately 50 cm.

20. The laser of claim 16 wherein said totally reflective mirror and said partially reflective mirror are coated with a multi-layer dielectric V coating centered at 1.440 $\mu$m, and said Nd:YAG rod has a pair of flat end surfaces which are coated with an anti-reflective coating centered at 1.440 $\mu$m.

21. The laser of claim 16 wherein said totally reflective mirror and said partially reflective mirror are coated with a multi-layer dielectric V coating centered at 1.320 $\mu$m, and said Nd:YAG rod has a pair of flat end surfaces which are coated with an anti-reflective coating centered at 1.320 $\mu$m.

22. The laser of claim 21 wherein said partially reflective mirror has a reflectivity of approximately 90% and said totally reflective mirror has a reflectivity of at least 99.5%.

23. A laser comprising:
a totally reflective mirror and a partially reflective mirror disposed along an optical axis;

a Nd:YAG rod disposed along said optical axis between said first and second reflective mirrors;

a flashlamp disposed adjacent said Nd:YAG rod, said Nd:YAG rod and said flashlamp being disposed in a reflective housing having optical openings along said optical axis;

a flashlamp power source electrically coupled to said flashlamp;

a modulator having a variably controllable modulation frequency disposed along said optical axis between said Nd:YAG rod and one of said reflective mirrors, said modulator comprising an acousto-optical Q-switch electrically coupled to an RF driver;

a fire switch; and a control circuit having a first input electrically coupled to said fire switch, a first output electrically coupled to said flashlamp power source, and a second output electrically coupled to said RF driver and controlling said modulation frequency of said modulator; said control circuit in response to receiving a trigger signal from said fire switch sending at least one discharge signal to said flashlamp power source and at least one multiply gated modulation signal to said RF driver such that, when said control circuit receives said trigger signal from said fire switch, said laser generates an output comprising at least one burst of sub-pulses having predetermined peak powers.

24. The laser of claim 23 wherein said multiply gated modulation signal sent from said control circuit to said RF driver has a variably controllable gating frequency, and said control circuit sets said variably controllable gating frequency such that said laser produces an output comprising at least one burst of sub-pulses having predetermined peak powers.

25. The laser of claim 24 wherein said control circuit comprises a microprocessor.

26. The laser of claim 23 wherein said control circuit has a third output electrically coupled to said flashlamp power source, and a signal delivered from said control circuit to said flashlamp power source determines an amount of energy delivered from said flashlamp power source to said flashlamp in each instance that said flashlamp power source receives said discharge signal.

27. The laser of claim 26 further comprising control panel means for entering information indicative of a desired flashlamp pulse repetition rate and a desired flashlamp pulse energy into said control circuit.

28. The laser of claim 23 further comprising energy delivery monitoring means for measuring the amount of energy in each burst of sub-pulses output by said laser and providing feedback to said control circuit.

29. The laser of claim 23 wherein said partially reflective mirror has a reflectivity of approximately 60% and said totally reflective mirror has a reflectivity of at least 99.5%.

30. The laser of claim 23 wherein said totally reflective mirror and said partially reflective mirror are coated with a multi-layer dielectric V coating centered at 1.320 μm, and said Nd:YAG rod has a pair of flat end surfaces which are coated with an anti-reflective coating centered at 1.320 μm.

31. The laser of claim 30 wherein said partially reflective mirror has a reflectivity of approximately 90% and said totally reflective mirror has a reflectivity of at least 99.5%.

32. The laser of claim 23 wherein said totally reflective mirror and said partially reflective mirror are coated with a multi-layer dielectric V coating centered at 1.064 μm, and said Nd:YAG rod has a pair of flat end surfaces which are coated with an anti-reflective coating centered at 1.064 μm.

33. The laser of claim 23 wherein said partially reflective mirror comprises a concave mirror having a radius of curvature of approximately 60 cm and said totally reflective mirror comprises a convex mirror having a radius of curvature of approximately 50 cm.

34. An intracavity modulated pulsed laser comprising:
a totally reflective mirror and a partially reflective mirror disposed along an optical axis;
a pump chamber disposed between said mirrors along said optical axis, said pump chamber having a pair of optical openings formed therein and passing said optical axis;
a Nd:YAG rod disposed within said pump chamber along said optical axis;
a flashlamp disposed within said pump chamber adjacent said Nd:YAG rod;
cooling means for cooling said Nd:YAG rod and said flashlamp during a period of operation of said intracavity modulated pulsed laser;
an acousto-optical Q-switch disposed along said optical axis between said Nd:YAG rod and one of said mirrors;
an RF driver electrically coupled to said acousto-optical Q-switch;
a flashlamp power source electrically coupled to said flashlamp;
control circuit means electrically coupled to said RF driver and to said flashlamp power source for triggering one or more pump pulse discharges by said flashlamp, and for simultaneously with each pump pulse discharge delivering a gated modulation signal having a variably controllable frequency to said RF driver;
a fiber optic delivery system for carrying a laser output beam passed by said partially reflective mirror to a beam delivery means capable of spatial manipulation, said laser output beam comprising a plurality of multi-pulsed bursts having predetermined peak powers;
means for delivering said laser output beam passed by said partially reflective mirror to said fiber optic delivery system;
beam energy monitoring means disposed in a path of said laser output beam and electrically coupled to said control circuit means for monitoring an amount of energy contained in each multi-pulsed burst of said laser output beam and providing feedback signals indicative of said amount of energy contained in each multi-pulsed burst to said control circuit means;
control panel means electrically coupled to said control circuit means for inputting information indicative of a desired laser output burst energy and information indicative of a desired burst repetition rate into said control circuit means; and
laser firing means electrically coupled to said control circuit means for initiating said triggering of said flashlamp pump pulse discharges and for initiating the delivery of said gated modulation signals from said control circuit means to said RF driver.

35. A pulsed laser comprising:
a totally reflective mirror and a partially reflective mirror disposed along an optical axis;
a Nd:YAG rod disposed along said optical axis;
a flashlamp disposed adjacent said Nd:YAG rod;
an acousto-optical Q-switch disposed along said optical axis between said Nd:YAG rod and one of said mirrors;
an RF driver electrically coupled to said acousto-optical Q-switch;
a flashlamp power source electrically coupled to said flashlamp; and
a control circuit electrically coupled to said RF driver and to said flashlamp power source for triggering one or more pump pulse discharges by said flashlamp, and for delivering simultaneously with each pump pulse discharge a gated modulation signal having a variably controllable frequency to said RF driver.

36. The pulsed laser of claim 35 further comprising:
a pump chamber disposed between said mirrors along said optical axis, said pump chamber providing a reflective housing for said Nd:YAG rod and said flashlamp and having a pair of optical openings formed therein for passing said optical axis;
a control panel electrically coupled to said control circuit for inputting information indicative of a desired laser output burst energy and information indicative of a desired burst repetition rate into said control circuit; and
a fire switch electrically coupled to said control circuit means for initiating said triggering of said flashlamp pump pulse discharges and for initiating the delivery of said gated modulation signals from said control circuit to said RF driver.

37. The pulsed laser of claim 36 further comprising:
cooling means for cooling said Nd:YAG during a period of operation of said pulsed laser;
a fiber optic delivery system for carrying a laser output beam passed by said partially reflective mirror to a beam delivery means capable of spatial manipulation, said laser output beam comprising a plurality of multi-pulsed bursts having predetermined peak powers; and
means for delivering said laser output beam passed by said partially reflective mirror to said fiber optic delivery system.

38. The pulsed laser of claim 37 further comprising beam energy monitoring means disposed in a path of said laser output beam and electrically coupled to said control circuit means for monitoring an amount of energy contained in each multi-pulsed burst of said laser output beam and providing feedback signals indicative of said amount of energy contained in each multi-pulsed burst to said control circuit means.

39. An intracavity modulated pulsed laser comprising:
- a totally reflective mirror and a partially reflective mirror disposed along an optical axis;
- an amplification medium disposed along said optical axis;
- a flashlamp disposed adjacent said amplification medium;
- an acousto-optical Q-switch disposed along said optical axis between said amplification medium and one of said mirrors;
- an RF driver electrically coupled to said acousto-optical Q-switch;
- a flashlamp power source electrically coupled to said flashlamp; and
- a control circuit electrically coupled to said RF driver and to said flashlamp power source for triggering one or more pump pulse discharges by said flashlamp, and for delivering simultaneously with the triggering of each pump pulse discharge of said flashlamp a gated modulation signal having a predetermined gating frequency to said RF driver such that said laser, in response to each triggering of a pump pulse discharge by said flashlamp, generates an output burst comprising a plurality of sub-pulses having predetermined peak powers.

40. The intracavity modulated pulsed laser of claim 39 further comprising:
- a pump chamber disposed between said mirrors along said optical axis, said pump chamber providing a reflective housing for said amplification medium and said flashlamp and having a pair of optical openings -formed therein for passing said optical axis;
- control panel means electrically coupled to said control circuit for inputting information indicative of a desired laser output burst energy and information indicative of a desired burst repetition rate into said control circuit means; and
- laser firing means electrically coupled to said control circuit for initiating said triggering of said flashlamp pump pulse discharges and for initiating the delivery of said gated modulation signals from said control circuit to said RF driver.

41. The intracavity modulated pulsed laser of claim 40 further comprising:
- cooling means for cooling said amplification medium during a period of operation of said intracavity modulated pulsed laser;
- a fiber optic delivery system for carrying a laser output beam passed by said partially reflective mirror to a beam delivery means capable of spatial manipulation, said laser output beam comprising a plurality of multi-pulsed bursts having predetermined peak powers; and
- means for delivering said laser output beam passed by said partially reflective mirror to said fiber optic delivery system.

42. The intracavity modulated pulsed laser of claim 41 further comprising beam energy monitoring means disposed in a path of said laser output beam and electrically coupled to said control circuit means for monitoring an amount of energy contained in each multi-pulsed burst of said laser output beam and providing feedback signals indicative of said amount of energy contained in each multi-pulsed burst to said control circuit means.

43. A laser comprising:
- a first reflective surface and a second reflective surface disposed along an optical axis;
- an amplification medium disposed along said optical axis between said first and second reflective surfaces;
- a pulsed pumping means disposed adjacent said amplification medium for delivering energy pump pulses having a predetermined duration to said amplification medium; and
- a modulator having a predetermined modulation frequency disposed along said optical axis between said amplification medium and one of said reflective surfaces, said modulator being adapted to modulate a beam generated by said amplification medium at said predetermined modulation frequency such that said laser, upon the delivery of each pump pulse to said amplification medium, produces an output burst comprising a plurality of sub-pulses, said sub-pulses being distributed over the duration of each pump pulse and having predetermined peak powers.

44. The laser of claim 42 further comprising a control circuit coupled to said modulator for controlling said modulation frequency of said modulator.

45. The laser of claim 44 wherein,
- said amplification medium comprises a Nd:YAG rod;
- said pulsed pumping means comprises a flashlamp, which delivers energy pump pulses having a duration of approximately 100 $\mu$s to said Nd:YAG rod; and
- said modulator comprises an acousto-optical Q-switch which is controlled to modulate at a gating frequency between 30 and 320 kHz.

46. An intracavity modulated pulsed laser comprising:
- a totally reflective mirror and a partially reflective mirror disposed along an optical axis;
- a pump chamber disposed along said optical axis and having a pair of optical openings formed therein for passing said optical axis;
- an amplification medium disposed within said pump chamber along said optical axis;
- a flashlamp disposed within said pump chamber adjacent said amplification medium for providing pump pulses having a duration of approximately 100 $\mu$s to said amplification medium;
- an acousto-optical Q-switch disposed along said optical axis between said amplification medium and one of said mirrors;
- an RF driver electrically coupled to said acousto-optical Q-switch;
- a flashlamp power source electrically coupled to said flashlamp; and
- a control circuit electrically coupled to said RF driver and to said flashlamp power source for triggering one or more pump pulse discharges by said flashlamp, and for delivering simultaneously with the triggering of each pump pulse discharge of said flashlamp a gated modulation signal having a gating frequency between 30 and 320 kHz to said RF driver.

47. The intracavity modulated pulsed laser of claim 46 further comprising:

control panel means electrically coupled to said control circuit means for inputting information indicative of a desired laser output burst energy and information indicative of a desired burst repetition rate into said control circuit means; and laser firing means electrically coupled to said control circuit means for initiating said triggering of said flashlamp pump pulse discharges and for initiating the delivery of said gated modulation signals from said control circuit means to said RF driver.

48. The intracavity modulated pulsed laser of claim 47 further comprising:

cooling means for cooling said amplification medium during a period of operation of said intracavity modulated pulsed laser;

a fiber optic delivery system for carrying a laser output beam passed by said partially reflective mirror to a beam delivery means capable of spatial manipulation, said laser output beam comprising a plurality of multi-pulsed bursts having predetermined peak powers;

means for delivering said laser output beam passed by said partially reflective mirror to said fiber optic delivery system.

49. The intracavity modulated pulsed laser of claim 48 further comprising beam energy monitoring means disposed in a path of said laser output beam and electrically coupled to said control circuit means for monitoring an amount of energy contained in each multi-pulsed burst of said laser output beam and providing feedback signals indicative of said amount of energy contained in each multi-pulsed burst to said control circuit means.

50. A laser comprising:

a totally reflective mirror and a partially reflective mirror disposed along an optical axis;

an amplification medium disposed along said optical axis between said first and second reflective mirrors;

a flashlamp disposed adjacent said amplification medium, said amplification medium and said flashlamp being disposed in a reflective housing having optical openings along said optical axis;

a flashlamp power source electrically coupled to said flashlamp;

a modulator having a predetermined modulation frequency disposed along said optical axis between said amplification medium and one of said reflective mirrors;

a fire switch; and a control circuit having a first input electrically coupled to said fire switch, a first output electrically coupled to said flashlamp power source, and a second output electrically coupled to said modulator and controlling said modulation of said modulator; said control circuit in response to receiving a trigger signal from said fire switch sending at least one discharge signal to said flashlamp power source and at least one multiply gated modulation signal to said modulator such that, when said control circuit receives said trigger signal from said fire switch, said laser generates an output comprising at least one burst of sub-pulses having predetermined peak powers.

51. The laser of claim 50 wherein, said amplification medium comprises a Nd:YAG rod;

said flashlamp delivers energy pump pulses having a duration of approximately 100 $\mu s$ to said Nd:YAG rod; and said modulator comprises a RF driver electronically coupled to an acousto-optical Q-switch and is controlled to modulate at a gating frequency between 30 and 320 kHz.

* * * * *